United States Patent [19]

Hettinga

[11] 4,125,490

[45] Nov. 14, 1978

[54] METHOD OF FORMING DIMENSIONALLY STABLE FOAMED ARTICLES OF POLYVINYL AROMATIC RESINS AND RESULTANT PRODUCT

[76] Inventor: Siebolt Hettinga, Puckerbrush Rd., Adel, Iowa 50003

[21] Appl. No.: 674,072

[22] Filed: Apr. 6, 1976

[51] Int. Cl.$^2$ .............................................. B29D 27/00
[52] U.S. Cl. ........................................ 521/51; 33/379; 260/42.14; 264/45.3; 264/45.5; 264/DIG. 14; 264/DIG. 17; 264/DIG. 83; 521/12; 521/146; 521/98
[58] Field of Search ............... 264/DIG. 17, DIG. 5, 264/DIG. 14, DIG. 83, 211, 45.3, DIG. 13; 260/2.5 B, 42.14, 42.44, 2.5 B, 2.5 HB; 33/DIG. 11, 365, 379, 381, 382, 383

[56] References Cited

U.S. PATENT DOCUMENTS

| | | | |
|---|---|---|---|
| 2,728,735 | 12/1955 | Anderson | 260/42.14 X |
| 3,268,636 | 8/1966 | Angell | 264/DIG. 83 |
| 3,661,810 | 5/1972 | Gahmig | 260/2.5 B |
| 3,745,203 | 7/1973 | Harper | 264/DIG. 83 |
| 3,921,306 | 11/1975 | Provi | 33/379 |
| 3,927,159 | 12/1975 | Tomikawa et al. | 264/DIG. 17 |
| 3,931,067 | 1/1976 | Goldberg et al. | 260/42.14 X |
| 3,950,484 | 4/1976 | Egli | 264/DIG. 83 |
| 4,048,208 | 9/1977 | Spicuzza et al. | 264/211 X |
| 4,048,272 | 9/1977 | Spicuzza | 264/211 X |

FOREIGN PATENT DOCUMENTS

700,613  12/1964  Canada .................................. 260/42.14

OTHER PUBLICATIONS

Whittington; Lloyd R., "Whittington's Dictionary of Plastics", Stamford, Conn., Technomic, c1968, preface; pp. 179–181.
The Condensed Chemical Dictionary, Eighth Edition, Revised by Gessner G. Hawley, New York, Van Nostrand Reinhold, c1971, p. 87.
Simonds; Herbert R., Archie J. Weith and M. H. Bigelow, "Handbook of Plastics", Second Edition, Princeton, N.J., D. Van Nostrand, c1949, pp. 1425, 1428.
Stern; H. J., "Rubber: Natural and Synthetic", London, Maclaren & sons, 1954, pp. 2–5; 51–53.
McPherson; A. T. and Alexander Klemin, editors, "Engineering Uses of Rubber", New York, Reinhold, c1956, pp. 18–21.
Bernhardt; Ernest C., Edt., "Processing of Thermoplastic Materials", New York, Reinhold, c1959, pp. 156, 157, 228, 229, 230.
"SPI Plastics Engineering Handbook", Third Edition, New York, Reinhold, c1960, pp. x/v, x/vii.
McKelvey; James M., "Polymer Processing", New York, John Wiley and Sons, c1962, pp. 277, 285–291.
Dorian; A. F., "Six-Language Dictionary of Plastics and Rubber Technology", London, Ilippe, books, c1965, pp. 381, 409, 470.
Schenkel, Gerhard, "Plastics Extrusion Technology and Theory; the Design and Operation of Screw Extruders for Plastics", New York, American Elsevier Publishing Co., c1966, pp. 15, 16, 402, 403.
Encyclopedia of Polymer Science and Technology, vol. 8, Norbert M. Bikales, Edt., Section: "Melt Extrusion", New York, Interscience, c1968, pp. 554–556, 559–561.
Encyclopedia of Polymer Science and Technology, vol. 9, Norbert M. Bikales, Edt., Section: "Molding", New York, Interscience, c1968, pp. 8, 63.

*Primary Examiner*—Philip Anderson

[57] ABSTRACT

A rigid, dimentionally stable, distortion-free article of foamed polyvinyl aromatic resin, having a solid outer skin, is formed by incorporating in a foamable polyvinyl aromatic resin a finely, divided inert solid that has been surface treated to render the solid hydrophobic and then molding the foamable composition under foaming conditions. Foamed polyvinyl aromatic resin articles molded in accordance with the present invention have physical dimensions capable of meeting tolerances in the order of ± 0.002 inches and are suitable for use in the manufacture of precision measuring devices and, particularly, frames for level instruments.

9 Claims, No Drawings

METHOD OF FORMING DIMENSIONALLY STABLE FOAMED ARTICLES OF POLYVINYL AROMATIC RESINS AND RESULTANT PRODUCT

BACKGROUND OF THE INVENTION

1. Field of the Invention

This invention relates to a method for making foamed articles and, more particularly, to a method for making foamed styrene polymer articles suitable for use as precision level frames, the articles being characterized by a high degree of dimensional stability, a cellular core and a substantially non-cellular, integral peripheral smooth surfaced shell.

2. The Prior Art

The manufacture of level instruments generally requires relatively highly skilled labor in the final production phases to precisely align the level and plumb vials thereof in relation to the working surfaces of the level frame. In U.S. Pat. No. 3,311,990, there is disclosed a level frame fabricated with precision notched mounting means for engaging and retaining the vial. In assembling the level, the assembler inserts the vial into the mounting means and secures cover plates on each side of the frame over the vial. The cover plates serve to automatically align the longitudinal axis of the vial in a plane normal to the working surfaces of the frame, thereby obviating the time consuming process of having the assembler visually observe, judge and adjust the position of the vial to obtain a predetermined bubble alignment. Thus, it is critical to the utility of such level frames that the dimensions of the notches and the distance that they are spaced apart be maintained within relatively close tolerances.

The material generally used for the manufacture of level frames is extruded aluminum. One of the problems encountered with aluminum levels is that because of the excellent heat conductivity of aluminum, it is very uncomfortable for workmen to use such levels for outdoor projects on cold winter days.

Although the substitution of non-conductive thermoplastic resins for aluminum in the level frames would appear to be an easy solution to the problem, the manufacture of levels and, particularly levels of the type disclosed in U.S. Pat. No. 3,311,990 is not easily accomplished because of the difficulty in molding frames having mounting means meeting the precision tolerances discussed above.

SUMMARY OF THE INVENTION

In accordance with the present invention, there is provided a process for the manufacture of rigid dimensionally stable, distortion-free foamed polyvinyl aromatic resin articles wherein there is incorporated in a foamable polyvinyl aromatic resin a finely divided inert solid that has been surface treated to render the solid hydrophobic. The foamable resin containing the hydrophobic treated solid is injected in a mold under foaming conditions for a time sufficient to cause foaming and solidification of the resin.

By following the practice of the present invention, non-heat conductive polyvinyl aromatic resin articles, having a substantially smooth, non-porous outer skin and a foamed interior are repetitively molded to meet exacting tolerance specifications. The method of the present invention is applicable to the manufacture of a wide variety of lightweight, non-heat conductive articles and is particularly applicable to the manufacture of level frames of the type disclosed in U.S. Pat. No. 3,311,990.

The term "polyvinyl aromatic resin" as used herein means a polymer or copolymer of a vinyl aromatic monomer such as styrene, chlorostyrene, vinyltoluene or α-methylstyrene. Copolymers include copolymers of vinyl aromatic monomers with another olefinic monomer, for example, acrylonitrile, vinyl chloride, vinyl acetate, methyl acrylate, methyl methacrylate or ethyl acrylate. Impact grade styrene polymers, i.e. styrene polymers which have been modified before or after polymerization with a natural or synthetic rubber are preferred in the practice of the present invention.

The term "foamable polyvinyl aromatic resin" as used herein means a polyvinyl aromatic resin to which has been added a blowing agent. Chemical blowing agents which generate a gas at temperatures above room temperature are preferred in the practice of the present invention because of their ease of handling. Organic nitrogen compounds that yield nitrogen on heating are especially preferred in the practice of the present invention. An example of a preferred organic nitrogen blowing agent includes 1, 1-azobis-formamide. These organic nitrogen compounds have a decomposition temperature in the order of 195° - 210° C and have a gas yield of about 220 ml/g.

The amount of blowing agent that is incorporated in the polyvinyl aromatic resin generally ranges from 0.25 to 5% by volume based on the volume of 100 pounds of the polyvinyl aromatic resin and preferably 0.5 to 2% by volume of the blowing agent is incorporated in the polyvinyl aromatic resin.

The finely divided inert solid powder is incorporated in the foamable polyvinyl aromatic resin at a concentration level of about 0.25 to 5% by volume, based on the volume of 100 pounds of the polyvinyl aromatic resin and preferbly about 1 to about 3 percent by volume. The solid powder generally has a particular size in the order of about 1 to about 30 microns and preferably the particle size of the powder is in the range of about 2 to about 25 microns. Examples of finely divided inert solid powders which are useful in the practice of the present invention include silica, alumina and calcium carbonate. It is critical to the practice of the present invention that the inert solid powder be surface treated to render the powder hydrophobic. One method of rendering the solid powder hydrophobic is to contact the finely divided solid particles with a water repellent material such as mineral oil or wax. Finely divided solid materials which have been surface treated to render them hydrophobic are available commercially. An example of a commercially available finely divided solid material that has been surface treated to render it hydrophobic is a surface treated calcium carbonate sold by the Pfizer Company under the trademark HI-PFLEX 100. HI-PFLEX 100 is described as a surface treated high calcium limestone product which is completely hydrophobic. The composition and physical properties of HI-PFLEX 100 are as follows:

| Composition (typical - before treatment) | | |
|---|---|---|
| Calcium Carbonate | $(CaCO_3)$ | 97% |
| Silicon Dioxide | $(SiO_2)$ | 1.2% |
| Aluminum Oxide | $(Al_2O_3)$ | 0.25% |
| Ferric oxide | $(Fe_2O_3)$ | 0.08% |
| Physical Properties (typical) | | |
| Specific Gravity | | 2.71 |
| Oil Absorption | | 14 lbs./100 lbs. |
| Top Particle Size | | 15 microns |

-continued

| Average Particle Size | 3.0 microns |
|---|---|
| Surface Area m²/gm) (nitrogen absorption) | 3.5 |
| Dry Brightness | 91 |
| Percent Wet Out in Water | 0% |

The criticality of the incorporation of the hydrophobic surface treated solid particles in the foamable polyvinyl aromatic resin composition will hereinafter be illustrated. As will hereinafter be illustrated, if the surface treated solid particles are incorporated in the foamable polyvinyl aromatic compositions at the designated concentration levels, the article molded therefrom is a unitary article having a continuous inner core of foamed resin that is integral and coextensive with a smooth outer self-supporting skin of solidified, non-foamed resin. If the solid material added to the foamable composition is not surface treated to render it hydrophobic, the outer skin is wrinkled, and the dimensions of the molded product vary with unpredictable tolerances.

In addition to the incorporation of a hydrophobic surface treated inert solid powder into the foamable polyvinyl aromatic resin composition, there is also added a temperature control agent. Any conventional temperature control agent can be employed in the practice of the present invention. Temperature control agents are used to vary the temperature at which the blowing agent decomposes, and by the proper choice of a temperature control agent, premature blowing of the polyvinyl aromatic resin composition is avoided. Examples of temperature control agents which can be used in the practice of the present invention include inorganic compounds such as zinc oxide, magnesium oxide and metal salts of fatty acids such as zinc stearate and barium stearate. The temperature control agent is generally incorporated in the foamable polyvinyl aromatic resin composition at a concentration of about 0.01 to about 1.0 percent by volume, based on the volume of 100 pounds of the polyvinyl aromatic resin, and preferably about 0.05 to 0.2 percent by volume of the temperature control agent is incorporated in the foamable polyvinyl aromatic resin composition.

Of course, mixtures of two or more blowing agents, temperature control agents and hydrophobic treated inert solid powders may be used in the practice of the present invention.

Also various conventional additives such as antioxidants, stabilizers, antistatic agents, pigments and the like can also be incorporated in the foamable polyvinyl aromatic resin composition.

Any conventional method may be used for incorporating the blowng agent, hydrophobic treated inert powder, temperature control agents and other additives into the foamable polyvinyl aromatic resin compositions. The simplest and preferred method is to dry blend the blowing agent, inert powder and temperature control agent with pellets of the polyvinyl aromatic resin.

In molding the foamable polyvinyl aromatic resin composition, the blend of polyvinyl aromatic resin, blowing agent, hydrophobic treated inert powder is charged to a screw extruder or other mixing device, and the blend is compressed and plasticated at about 300° to 450° F to prepare a homogeneous blend of the admixture of materials and to initiate the decomposition of the blowing agent. After the admixture has been thoroughly plasticated into a homogeneous blend, the blend is injected into a mold cavity. The amount of blend material which is injected into the mold cavity is less than the amount necessary to fill the mold cavity and generally the blend charge injected into the mold cavity is an amount which will fill about 60 to about 85 percent of the available space in the mold cavity. The mold cavity is maintained at a temperature below which the blend material will deform, that is below about 260° F, and generally the mold is maintained at a temperature in the range of 140° to 180° F. Immediately upon the entry of the blend material into the mold cavity, the mass of blend material starts expanding, and since the mold is at a substantially lower temperature than the blend material, the outer periphery of the mass of expanded material begins to set and form a hardened shell simultaneous with the expansion of the blowing agent in the unhardened inner core portion of the blend charge. In this manner, the entire blend material is expanded to fill the mold cavity. The outer shell as it cools is pressed by the expanding inner core into precise and exact conformity with the wall surfaces of the mold cavity as the foamed structure is formed.

After expansion of the blend material is completed and the blend has been expanded to take on the precise shape of the mold cavity, the molded article is removed from the mold cavity and allowed to cool to room temperature. In the molding of level frames, the blend charge is allowed to remain in the mold cavity for a period of at least 4 minutes and preferably for a period up to 8 minutes to insure that expansion of the blend has been completed and the blowing agent is dormant. After the 4 to 8 minutes residence time in the mold cavity, the warm molded level frame is mechanically removed from the mold cavity and is allowed to remain undisturbed for 48 hours before any finishing, evaluation or testing of the frame is attempted.

The following examples are intended to further illustrate the present invention without limiting the same in any manner.

EXAMPLE I

A level frame having a structure substantially identical to that shown in U.S. Pat. No. 3,311,990, having a smooth non-foamed surface over all exposed sides thereof and a substantially foamed interior was made by dry blending an inpact grade polystyrene sold by Amoco Chemicals Corporation under the code "Impact Grade H4M" with 1% by volume, based on the volume of 100 lbs. of the polystyrene of azodicarbonamide to prepare a foamable polystyrene composition. The polystyrene had the following properties:

| Property | Typical Value | Units | ASTM Test |
|---|---|---|---|
| Specific gravity | 1.03 | — | D792-66 (at 23° C) |
| Tensile Strength at Yield | 3,000 | psi | D638-68 |
| Tensile Strength at Break | 3,000 | psi | (at 0.2 in. per min.) |
| Elongation at Break | 50 | % | |
| Izod Impact Strength | | ft.-lb/in. of notch | D256-70 (at 23° C) |
| (¼-in. bar) | 1.4 | | |
| (⅛-in. bar) | 3.0 | | |
| Modulus in Flexure | 270 | 10³ | D790-70 (¼-in. bar proc. A) |
| Deflection Temperature (Annealed) | 185 | ° F | D648-61 (¼-in. bar at 264 psi) |
| Vicat Softening Point | 200 | ° F | D1525-70 B) (Rate B) |

Also dry blended with the foamable composition was 0.1% by volume, based on the volume of 100 lbs. of the polystyrene, of zinc stearate and about 2%, by volume, based on the volume of 100 lbs. of the polystyrene, of HI-PFLEX 100.

The dry blended foamable composition was then added to a screw injection molding machine. The foamable composition was plasticated in the screw section at a mixing temperature of 400° to 450° F. After mixing the foamable composition to insure a homogeneous blend, the blend was injected into a level frame mold filling about 65 – 70 percent of the interior volume of the mold cavity. The temperature of the level frame mold was maintained at about 160° F. The injected blend was allowed to remain in the mold for 8 minutes to allow for complete foaming of the core. The mold was then opened, and the molded level frame was mechanically removed from the mold and allowed to remain undisturbed at room temperature and ambient pressure for 48 hours. The level frame, upon examination, was found to have a smooth surface skin and an inner foamed core. The level frame was surprisingly sturdy and stiff in view of its light weight, and no indication of warpage or other visual distortion was found anywhere after careful visual examination thereof. Measurement of the notched portions of the level with a micrometer indicated that the positioning of the notches was within ± 0.002 inches of customer specifications and thereby met the required tolerances for the level frame.

For purposes of comparison, the procedure of Example 1 was repeated with the exception that calcium carbonate which had not been the surface treated was substituted for HI-PFLEX. Level frames molded in accordance with this comparative procedure were found to have wrinkled "elephant skin" outer surfaces and overall poor appearance and micrometer measurements of the level frame for dimensional accuracy indicated excessive variances in tolerances which made the level frame unacceptable for commercial use.

EXAMPLE II

The procedure of Example 1 was repeated with the exception that calcium carbonate particles were surface treated with a commercially available liquid wax product ("Arrow" Wax) by saturating the calcium carbonate particles with the wax at a 3:1 CaCO : wax volume ratio and then drying the wax saturated particles at 160° F.

When the wax treated calcium carbonate particles were substituted for the HI-PFLEX particles used in Example 1, molded level frames were obtained which had dimensional stability characteristics substantially similar to those of Example 1 and also met the tolerance specifications required for commercial use of the frames.

What is claimed is:

1. A method for forming a substantially rigid, dimensionally stable, interiorally foamed, polyvinyl aromatic resin article having a substantially non-foamed outer skin, which method comprises:
    preparing a foamable melt comprised of a polyvinyl aromatic resin and a blowing agent;
    incorporating in the foamable melt a finely divided inert solid material, the material having been treated to render the solid surface hydrophobic;
    plasticating the foamable composition and the hydrophobic surface treated solid at an elevated first temperature to prepare a homogeneous charge for injection into a mold having a mold cavity;
    injecting the homogeneous charge into the mold cavity maintained at a second temperature which is lower than the first temperature and is sufficient to cause solidification of that portion of the mold charge which contacts the walls of the mold cavity to form a solid skin;
    allowing the charge to expand in the old cavity so as to take on the shape of the mold cavity and then
    removing the molded foamed article from the mold cavity and allowing the article to cool to room temperature.

2. The method of claim 1 wherein the polyvinyl aromatic resin is polystyrene.

3. The method of claim 2 wherein the polystyrene is impact grade polystyrene.

4. The method of claim 1 wherein the solid material is calcium carbonate.

5. The method of claim 4 wherein the calcium carbonate is surface treated with a wax to render the surface hydrophobic.

6. The method of claim 1 wherein the solid material is incorporated in the polyvinyl aromatic resin at a concentration of about 0.25 to about 5 percent by volume, based on the violume of 100 pounds of the polyvinyl aromatic resin.

7. The method of claim 1 wherein the solid material has a particle size in the range of about 1 to about 30 microns.

8. The method of claim 1 wherein the first temperature is about 300° to 450° F and the second temperature is about 140° to about 180° F.

9. A level frame having a substantially smooth, non-porous outer skin and a foamed interior formed solely of a polyvinyl aromatic resin molded by the method of claim 1 and capable of meeting tolerances in the order of ±0.002 inches.

* * * * *